(12) United States Patent
Colenbrander

(10) Patent No.: US 8,990,446 B2
(45) Date of Patent: *Mar. 24, 2015

(54) METHOD AND APPARATUS FOR DECREASING PRESENTATION LATENCY

(71) Applicant: Sony Computer Entertainment America LLC, San Mateo, CA (US)

(72) Inventor: Roelof Roderick Colenbrander, Santa Ana, CA (US)

(73) Assignee: Sony Computer Entertainment America, LLC, San Mateo, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/790,269

(22) Filed: Mar. 8, 2013

(65) Prior Publication Data

US 2014/0101341 A1    Apr. 10, 2014

Related U.S. Application Data

(60) Provisional application No. 61/709,873, filed on Oct. 4, 2012.

(51) Int. Cl.
*G06F 3/00* (2006.01)
*G06F 13/12* (2006.01)
*G06F 3/14* (2006.01)
*G06F 9/44* (2006.01)

(52) U.S. Cl.
CPC .............. *G06F 13/12* (2013.01); *G06F 3/1423* (2013.01); *G06F 9/4411* (2013.01)
USPC ................................................. 710/14; 710/5

(58) Field of Classification Search
None
See application file for complete search history.

(56) References Cited

U.S. PATENT DOCUMENTS

| | | | |
|---|---|---|---|
| 8,766,955 B2* | 7/2014 | Loveridge et al. ............ 345/204 |
| 2004/0085336 A1 | 5/2004 | Kim | |
| 2006/0012586 A1 | 1/2006 | Ochs et al. | |
| 2010/0013855 A1 | 1/2010 | Allen et al. | |
| 2011/0142245 A1* | 6/2011 | Toba et al. ...................... 381/22 |
| 2012/0229460 A1 | 9/2012 | Fortin | |
| 2013/0038793 A1* | 2/2013 | Yoshida et al. ............... 348/552 |
| 2014/0092004 A1* | 4/2014 | Mishra et al. ................. 345/156 |
| 2014/0096169 A1 | 4/2014 | Dodson et al. | |
| 2014/0101342 A1 | 4/2014 | Colenbrander | |

OTHER PUBLICATIONS

International Search Report and Written Opinion issued to International Application No. PCT/US2013/060882, dated Jan. 23, 2014.
U.S. Appl. No. 61/709,873 to Roelof Roderick Colenbrander filed Oct. 4, 2012.

(Continued)

*Primary Examiner* — Kris Rhu
(74) *Attorney, Agent, or Firm* — Joshua D. Isenberg; JDI Patent

(57) ABSTRACT

Aspects of the present disclosure describe automatically changing an output mode of an output device from a first output mode to a latency reduction mode. An initiation signal and the output data may be received from a client device platform or a signal distributor. Upon receiving the initiation signal, the output device may change the output mode from the first output mode to the latency reduction mode. Thereafter, the output device may receive an end latency reduction mode signal. The output device may then revert back to the first output mode. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

30 Claims, 6 Drawing Sheets

(56) References Cited

OTHER PUBLICATIONS

Non-Final Office Action for U.S. Appl. No. 13/790,289, dated Aug. 5, 2014.

Final Office Action for U.S. Appl. No. 13/790,289, dated Jan. 7, 2015.

Greg Adler; "The Secret Feature on Your HDTV: HDMI CEC"; May 26, 2008; TechHive; http://www.techhive.com/article/143777/article.html.

* cited by examiner

METHOD AND APPARATUS FOR DECREASING PRESENTATION LATENCY

CLAIM OF PRIORITY

This application is a nonprovisional of U.S. Provisional Patent Application No. 61/709,873, filed Oct. 4, 2012, the entire disclosures of which are incorporated herein by reference.

FIELD OF THE DISCLOSURE

The present disclosure is related to video game emulation. Among other things, this application describes a method and apparatus for automatically changing an output device from a first output mode to latency reduction mode.

BACKGROUND OF THE INVENTION

Modern televisions utilize image processing to improve the quality of the video displayed. For example, televisions may perform digital signal enhancements such as edge enhancements, or the television may utilize a buffer to improve image quality. These image processing steps delay the displaying of video frames. Depending on the television model and the video settings chosen, the delay due to the additional processing may be 50-100 milliseconds or even more. This delay is particularly a concern with plasma and liquid crystal display (LCD) televisions. In order to keep the audio synchronized with the video, televisions may delay the audio signal by a similar amount.

However, when utilizing applications that are sensitive to latencies, such as video games, even when the video and audio are synchronized, the delay may still be noticed. In the case of gaming system, it takes a certain period of time, before the user sees the result of his actions (e.g., pressing a button on a game controller) displayed by the television. The delay between the user's action and the display on the television is often referred to as a latency or system lag. This latency creates a problem in quickly moving gaming environments. For example, in a first-person shooter game long latencies may reduce a user's reaction time, and therefore cause the user to be shot when he would otherwise have had time to avoid an incoming attack.

For this reason modern televisions often contain a "game mode" in which some of the image processing steps are disabled in order to reduce the latency. While image quality may be affected by utilizing the game mode, it has been seen as a worthwhile tradeoff for those in the gaming community. The game mode option is especially important in the context of cloud gaming in which the latency due to the television delay forms a significant portion of the overall latency of the system.

However, there is no automatic way to switch between game mode and standard mode. Currently users have to switch back and forth between game mode and standard mode, which is a cumbersome process. Typically this involves entering into a menu and selecting the game mode from a list of options. Further, since the game mode is likely one of many viewing mode options, many gamers may not even be aware that their television supports such functionality. As such, users may be slow to adopt cloud-based gaming because of the perceived system lag that they presume that they cannot decrease. Therefore, it would be desirable to have a system that automatically selects the game mode for a user whenever they begin playing.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Aspects of the present disclosure describe a method and an apparatus for automatically changing an output mode of an output device from a first output mode to a latency reduction mode. An output device may receive a latency reduction mode initiation signal along with output data. The initiation signal and the output data may be received from a client device platform or a signal distributor. Upon receiving the initiation signal, the output device may change the output mode from the first output mode to the latency reduction mode. Thereafter, the output device may receive an end latency reduction mode signal. The output device may then revert the output mode back to the first output mode.

Aspects of the present disclosure describe a latency reduction mode that is configured to reduce the number of processing operations performed on content data by the output device. By way of example, and not by way of limitation, the output device may be configured to process output data to improve image or audio quality. In a latency reduction mode the image or audio processing may be reduced or eliminated in order to reduce the time required to output the content data.

Figure 1:
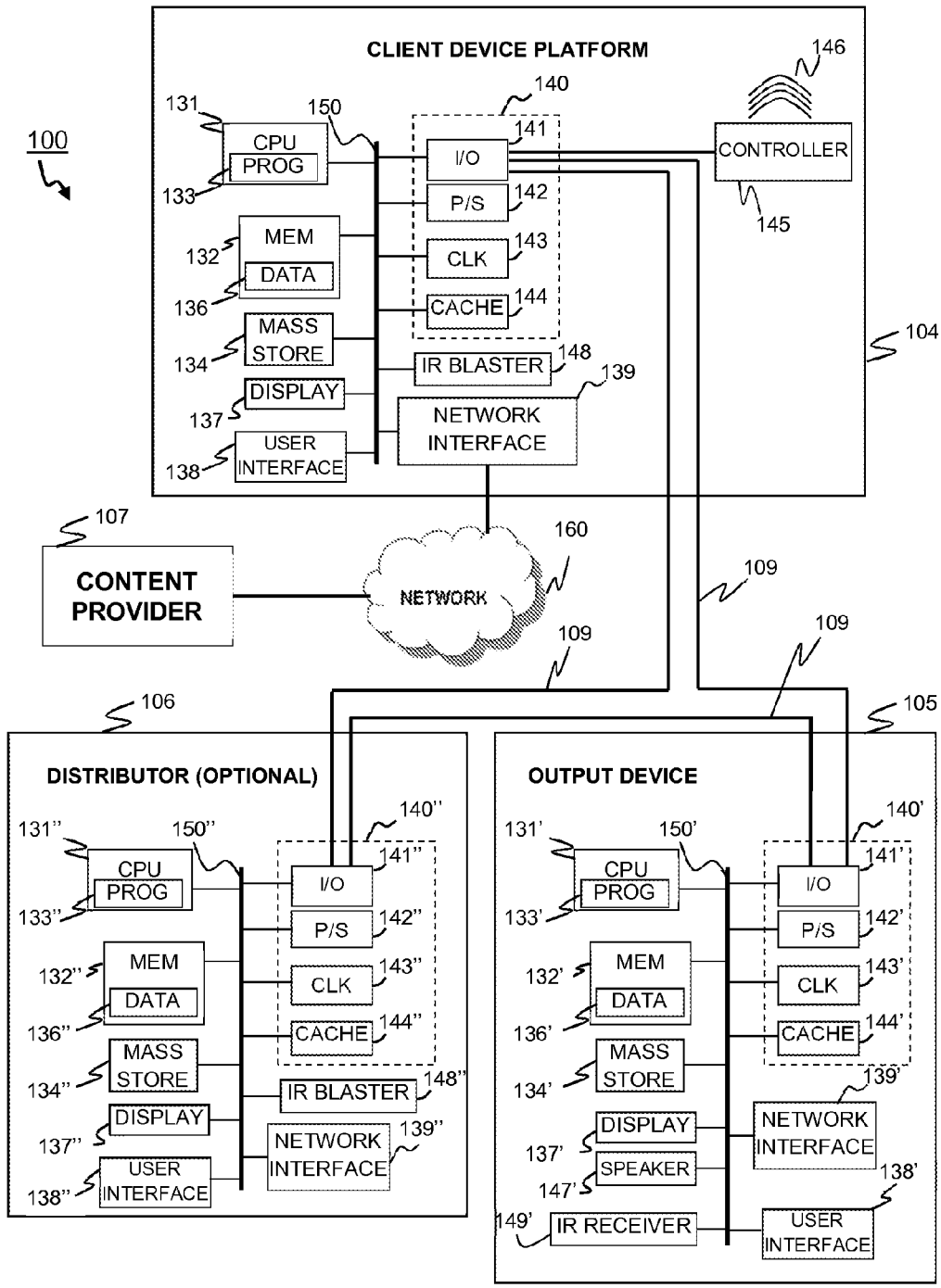
FIG. 1 is a schematic diagram of a client device platform, a distributor, and an output device communicating over a local network.

FIG. 1 is a schematic of a system 100 according to an aspect of the present disclosure. Output device 105 may be accessed by one or more client device platforms 104 through a data connection 109. A distributor 106 may receive content data 210 from the one or more client device platforms 105 and selectively route the desired stream of content data 210 to the output device 105. The client device platforms may receive content data 210 from a content provider 107 over a network 160.

Client device platform 104 may include a central processor unit (CPU) 131. By way of example, a CPU 131 may include one or more multiple core processors, e.g., a dual-core, quad-core or Cell processors. The client device platform 104 may also include a memory 132 (e.g., RAM, DRAM, ROM, and the like). The CPU 131 may execute a program 133, portions of which may be stored in the memory 132. The client device platform 104 may also include well-known support circuits 140, such as input/output (I/O) circuits 141, power supplies (P/S) 142, a clock (CLK) 143 and cache 144. By way of example, and not by way of limitation, the I/O circuits 141 may include a high-definition multimedia interface (HDMI) connection. The client device platform 104 may optionally include a mass storage device 134 such as a disk drive, CD-ROM drive, tape drive, or the like to store programs and/or data. The client device platform 104 may also optionally include a display unit 137. The display unit 137 may be in the form of a cathode ray tube (CRT) or flat panel screen that displays text, numerals, or graphical symbols. The client device platform 104 may also optionally include an infrared (IR) blaster 148. By way of example, the IR blaster 148 may be configured to deliver commands to an output device 105 instructing the output device 105 to change the output mode.

A controller 145 may be connected to the client device platform 104 through the I/O circuit 141 or it may be directly integrated into the client device platform 104. The controller 145 may facilitate interaction between the client device platform 104 and a user. The controller 145 may include a keyboard, mouse, joystick, light pen, touch pad, touch screen, hand-held controls (e.g., game controller) or other device. According to aspects of the present disclosure, the controller 145 may be capable of producing a haptic response 146.

The client device platform 104 may include a network interface 139, configured to enable the use of Wi-Fi, an Ethernet port, or other communication methods. The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 104 may send and receive data and/or requests for files via one or more data packets over the network 160.

In some implementations, network settings could be adjusted on the client device platform 104 for latency. By way of example, and not by way of limitation, the client device platform 104 may have network settings (e.g., buffer sizes, timeouts, power saving settings, and the like) that affect latency. Assuming such settings exist, adjusting them appropriately would feel like an overall latency improvement to the user. As an example, suppose a user presses a button on a gamepad to fire a bullet in a first person shooter (FPS) game. The network settings on the gamepad can be adjusted so that the button press event arrives earlier at a server, so the user will also see the response earlier on his output device.

I think these network settings exist. I expect there will be a trade-off between latency, efficiently using the network channel (you may not use the network to its full limit if you send network packets as soon as you can) and in the context of a mobile device you may drain your battery more quickly (e.g. network transceiver will be turned on a bigger portion of time).

The preceding components may exchange signals with each other via an internal system bus 150. The client device platform 104 may be a general purpose computer that becomes a special purpose computer when miming code that implements embodiments of the present invention as described herein. By way of example, and not by way of limitation, the client device platform 104 may be a gaming console, a set top box, a cable box, a personal computer, a tablet computer, a telephone, a cell phone, a DVD player, a Blu-Ray player, a digital video recorder (DVR), or other similar devices, or any combination thereof. Other possible types of devices that may be a client device platform includes streaming media players, such as the Roku SoundBridge network music player, the Roku DVP Internet streaming video receiving from Roku, Inc. of Saratoga, Calif. or Apple TV digital media receiver from Apple Inc of Cupertino, Calif.

The output device 105 may include a central processor unit (CPU) 131'. By way of example, a CPU 131' may include one or more multiple core processors, e.g., a dual-core, quad-core or Cell processors. The output device 105 may also include a memory 132' (e.g., RAM, DRAM, ROM, and the like). The CPU 131' may execute a program 133', portions of which may be stored in the memory 132'. The output device 105 may also include well-known support circuits 140', such as input/output (I/O) circuits 141', power supplies (P/S) 142', a clock (CLK) 143' and cache 144'. By way of example, and not by way of limitation, the I/O circuits 141' may include a high-definition multimedia interface (HDMI) connection. The output device 105 may optionally include a mass storage device 134' such as a disk drive, CD-ROM drive, tape drive, or the like to store programs and/or data. The output device 105 may also optionally include a display unit 137' and user interface unit 138' to facilitate interaction between the output device 105 and a user who requires direct access to the output device 105. The display unit 137' may be in the form of a cathode ray tube (CRT) or flat panel screen such as, but not limited to, an LCD, plasma, LED, or an OLED that displays text, numerals, or graphical symbols. The user interface unit 138' may include a keyboard, mouse, joystick, light pen, or other device. The output device 105 may also include an audio unit 147'. The audio unit 147' may be in the form of speakers. By way of example, and not by way of limitation, the speakers may be a single speaker, or a system of two or more speakers such as a surround sound speaker system. The output device 105 may also optionally include an IR receiver 149' configured to receive command signals from an IR blaster 148" from a distributor 106 or an IR blaster 148 from a client device platform 104. By way of example, the command signals may instruct the output device 105 to change the output mode of the client device platform 105. The output device 105 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The output device 105 may send and receive data and/or requests for files via one or more data packets over the network 160.

The preceding components may exchange signals with each other via an internal system bus 150'. The output device 105 may be a general purpose computer that becomes a special purpose computer when miming code that implements embodiments of the present invention as described herein. By way of example, and not by way of limitation, the output device 105 may be a television, a projector, a personal computer, a tablet computer, a speaker system, a whole house speaker system (i.e., a series of speakers located in two or more rooms throughout a building), a telephone, or any similar devices, or any combination thereof. Other possible devices that may be used as the output device 105 include mobile phones or portable game consoles, such as the PS Vita from Sony Computer Entertainment Inc. of Tokyo, Japan The output device 105 may have two or more output modes. Different output modes may be configured to display certain types of content data 210 in an optimal manner. By way of example, and not by way of limitation, under non-latency sensitive applications, such as viewing a live television feed delivered from a cable box, an output device may implement additional processing on the content data. By way of example, and not by way of limitation, the additional processing may include extensive buffering of a data stream and/or edge enhancements for each frame of a video stream. Additionally, the output device may be capable of implementing a latency reduction mode. By way of example, and not by way of limitation, the latency reduction mode may reduce or eliminate additional processing of the content data 210. The latency reduction mode may also be referred to as a "game mode". The different output modes may be implemented through the execution of different programs 133' or through hardware or firmware or any combination thereof. Additionally, additional output modes, including the addition of a latency reduction mode, may be added to an output device 105 through a firmware or software update.

The distributor 106 may include a central processor unit (CPU) 131". By way of example, a CPU 131" may include one or more multiple core processors, e.g., a dual-core, quad-core or processor architecture having a main processor and one or more co-processors, such as a Cell processor. The distributor 106 may also include a memory 132" (e.g., RAM, DRAM, ROM, and the like). The CPU 131" may execute a program 133", portions of which may be stored in the memory 132". The distributor 106 may also include well-known support circuits 140", such as input/output (I/O) circuits 141", power supplies (P/S) 142", a clock (CLK) 143" and cache 144". By way of example, and not by way of limitation, the I/O circuits 141" may include a high-definition multimedia interface (HDMI) connection. The distributor 106 may optionally include a mass storage device 134" such as a disk drive, CD-ROM drive, tape drive, or the like to store programs and/or data. The distributor 106 may also optionally include a display unit 137" and user interface unit 138" to facilitate interaction between the distributor 106 and a user who requires direct access to the distributor 106. The display unit 137" may be in the form of a cathode ray tube (CRT) or flat panel screen that displays text, numerals, or graphical symbols. The user interface unit 138" may include a keyboard, mouse, joystick, light pen, remote control, touch pad, touch screen, or other device. The distributor 106 may also optionally include an infrared IR blaster 148". By way of example, the IR blaster 148" may be configured to deliver commands to an output device 105 instructing the output device 105 to change the output mode. The distributor 106 may include a network interface 139", configured to enable the use of Wi-Fi, an Ethernet port, or other communication methods.

The network interface 139" may incorporate suitable hardware, software, firmware or some combination of two or more of these to facilitate communication via the electronic communications network 160. The network interface 139" may be configured to implement wired or wireless communication over local area networks and wide area networks such as the Internet. The distributor 106 may send and receive data and/or requests for files via one or more data packets over the network 160.

The preceding components may exchange signals with each other via an internal system bus 150". The distributor 106 may be a general purpose computer that becomes a special purpose computer when miming code that implements embodiments of the present invention as described herein. By way of example, and not by way of limitation, a distributor may be a set top box, a home entertainment system, an equalizer, a mixer, a wireless hub, or similar devices or any combination thereof.

Figure 2A:
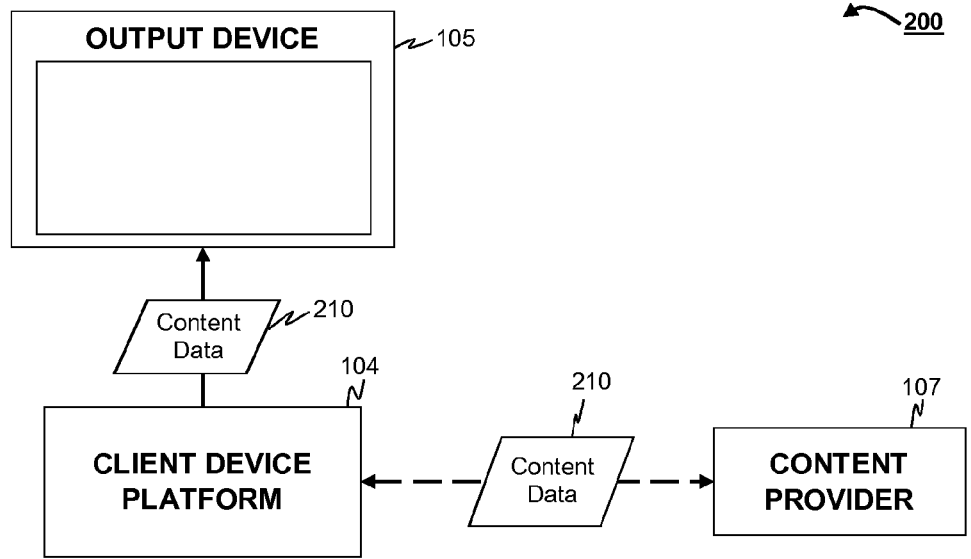
FIG. 2A is a diagram describing a system configuration where an output device is connected to a single client device platform according to an aspect of the present disclosure.
Figure 2B:
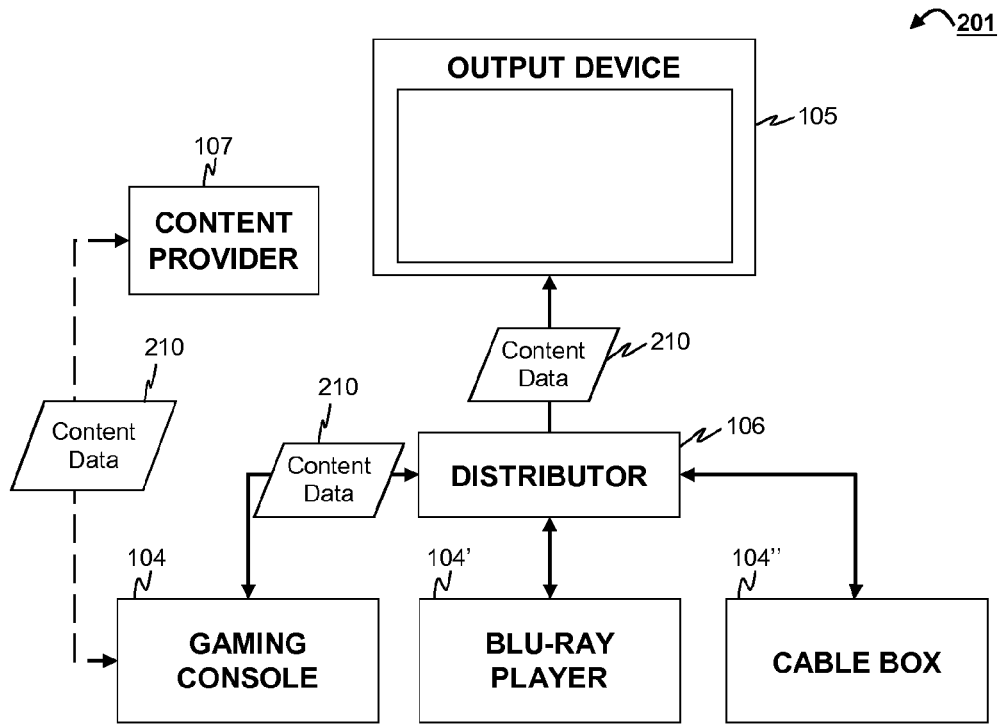
FIG. 2B is a diagram describing a system configuration where an output device is connected to a distributor that selectively routes content data delivered from one of a plurality of client device platforms to the output device according to an aspect of the present disclosure.

FIGS. 2A and 2B depict two possible system configurations that may utilize aspects of the present disclosure in order to reduce the latency in the display of content data 210 associated with a latency sensitive application. In FIGS. 2A and 2B dashed arrows indicate the transfer of data over a network 160 and solid arrows indicate the transfer of data over a data connection 109. By way of example, and not by way of limitation, the data connection 109 may be a wired connection or a wireless connection. Wired data connections 109 may include connections such as, but not limited to, HDMI Ethernet, Thunderbolt, Display Port, or coaxial connections. Wireless data connections 109 may include connections such as, but not limited to, Wi-Fi, internet wireless display (WiDi), wireless HD, wireless HDMI, Bluetooth, or infrared connections. By way of example, and not by way of limitation, the content data 210 may be a video stream and/or an audio stream. By way of example, and not by way of limitation, a latency sensitive application may be a video game delivered over a cloud based network, video conferencing, video chat, audio conferencing, or audio streaming over multiple speakers in separate rooms of a building. In addition, remote "desktop" applications, e.g., involving streaming of data for a computer program session running on a remote machine, may be considered a latency sensitive application. Examples of remote desktop applications include, but are not limited to like VNC, Citrix, Remote Desktop Protocol (RDP). Such applications may be used, e.g., to implement remote streaming of desktop sessions of conventional computer applications such as Microsoft Office, Adobe Photoshop and the like.

FIG. 2A is a block diagram of a first aspect of the present disclosure depicting system configuration 200. System configuration 200 includes an output device 105 that may receive content data 210 associated with a latency sensitive application directly from a client device platform 104. The client device platform 104 may receive the content data 210 from a content provider 107. By way of example, and not by way of limitation, a content provider 107 may be a cable company, a video game provider, or a telephone service provider, and any other company that delivers media or data communications over a network 160.

FIG. 2B is a block diagram of a second aspect of the present disclosure depicting system configuration 201. System configuration 201 includes an output device 105 that may receive content data 210 associated with a latency sensitive application from a distributor 106. This arrangement is useful when two or more client device platforms 104 each deliver content data 210 to a single output device 105. By way of example, and not by way of limitation, the distributor 106 may be a home theater system that is capable of receiving content data 210 from a gaming console 104, a Blu-Ray player 104', and a cable box 104". The distributor 106 may control which of the data connections 109 will be displayed on the output device 105 at any given time.

Figure 3A:
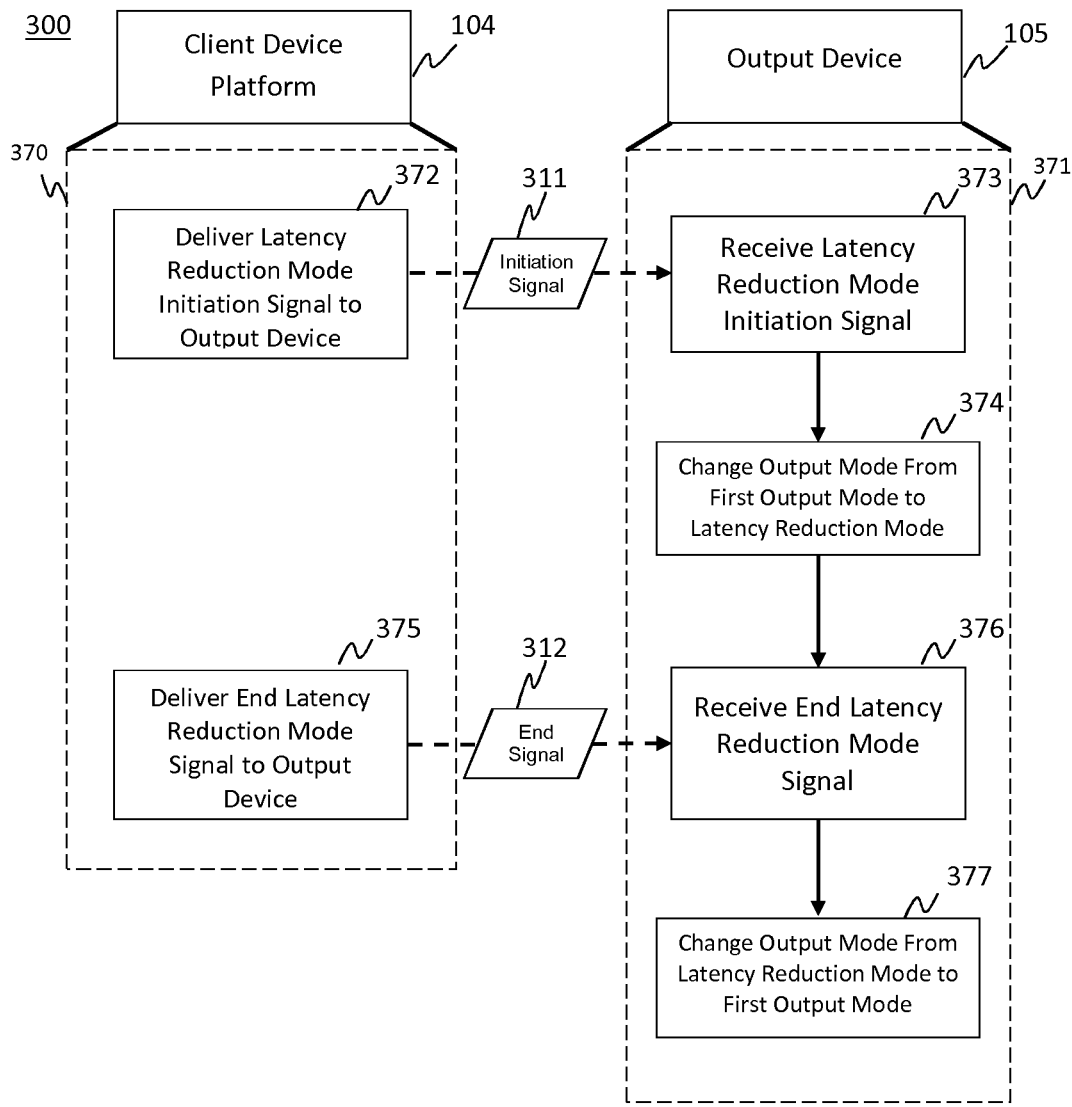
FIG. 3A is flow diagram of a method for automatically changing an output mode of an output device from a first output mode to a latency reduction output mode according to an aspect of the present disclosure.

As shown in FIG. 3A, the output device 105 may be configured to implement a method for automatically changing the output mode of the output device 105 from a first output mode to a latency reduction mode according to an inventive method 300. Various aspects of the method 300 may be implemented by execution of computer executable instructions running on the output device 105 and/or the client device platform 104 in conjunction with the actions of the output device 105. Specifically, an output device 105 may be configured, e.g., by suitable programming, to implement certain output device instructions 371. In addition, a client device platform 104 may be configured to implement certain client device platform instructions 370. In FIG. 3A the dashed arrows represent the flow of data between the client device platform 104 and the output device 105 over a data connection 109.

Upon receiving content data 210 associated with a latency sensitive application the client device platform 104 may automatically deliver a latency reduction mode initiation signal 311 to the output device 105 at block 372. The client device platform 104 may insert the initiation signal 311 into the data stream containing the content data 210 that is being delivered to the output device 105. By way of example, and not by way of limitation, the initiation signal 311 may be inserted into a header for a packet containing content data 210, or the initiation signal 311 may be sent as individual data packet in addition to the content data 210.

Alternatively, the initiation signal 311 may be a command signal delivered over the data connection 109. By way of example, and not by way of limitation, the initiation signal 311 may be a consumer electronics control (CEC) command CEC is a feature of the HDMI standard designed to allow devices attached by HDMI cables to control each other. Specifically, CEC is a one-wire bidirectional serial bus that uses the AV.link protocol to perform remote control functions. As such, the initiation signal 311 may be a CEC command delivered over an HDMI data connection 109 that instructs the output device 105 to change the output mode to the latency reduction mode. Further by way of example, and not by way of limitation, the initiation signal 311 may be an IR command delivered to the output device 105 by an IR blaster 148.

At 373 the output device 105 may receive the latency reduction mode initiation signal 311. The reception of the initiation signal 311 causes the output device 105 to change the output mode from a first output mode to a latency reduction mode. By way of example, and not by way of limitation, the first output mode may be the default output mode of the output device 105 or it may be an alternative display mode optimized for observing specific types of media, such as a movie display mode or a sports channel display mode. When the initiation signal 311 is not a command signal, the initiation signal 311 may indicate that the output device 105 needs to execute an output mode switching program in order to change the output mode to the latency reduction mode. By way of example, the output mode switching program may be a program 133' stored on the CPU 131' or in a memory 132' of the output device 105 that when executed causes the output device to change the output mode to the latency reduction mode. If the initiation signal 311 is a CEC command or an IR command, then initiation signal 311 may be configured to control the output device 105 and will automatically cause the output device 105 to change the output mode to the latency reduction mode without having to run an additional operation.

When the client device platform 104 is no longer delivering content data 210 that corresponds to a latency sensitive application, the client device platform 104 may deliver an end latency reduction mode signal 312 to the output device as shown at block 375. The end latency reduction mode signal 312 may be similar to that of latency reduction mode initiation signal 311 in that it may be a signal sent along with the content data 210, or it may be a CEC command signal or an IR command signal. At 376 the output device 105 may receive the end latency reduction mode signal 312. Upon receiving the end latency reduction mode signal 312, the output device 105 may change the output mode back to the first output mode. Similar to block 374, if the end latency reduction mode signal 312 is not a command signal, the end latency reduction mode signal 312 may indicate that the output device 105 needs to execute an output mode switching program in order to change the output mode back to the first output mode. Alternatively, if the end latency reduction mode signal 312 is a CEC command or an IR command, then end latency reduction mode signal 312 may be configured to control the output device 105 and will automatically cause the output device 105 to change the output mode back to the first output mode without having to run an additional operation.

Figure 3B:
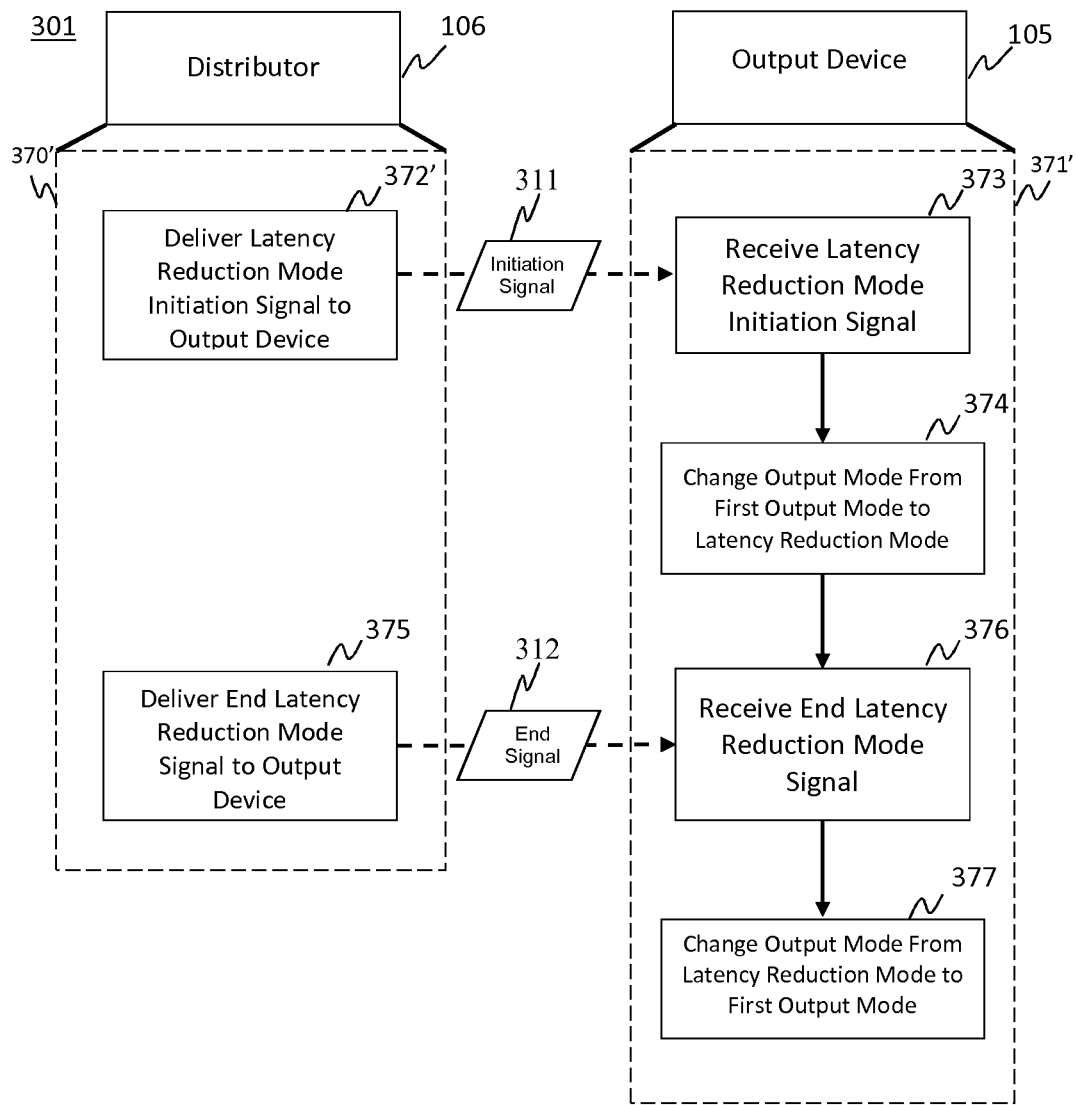
FIG. 3B is a flow diagram of a method for automatically changing an output mode of an output device from a first output mode to a latency reduction output mode according to an additional aspect of the present disclosure.

As shown in FIG. 3B, the output device 105 may be configured to implement a method for automatically changing the output mode of the output device 105 from a first output mode to a latency reduction mode according to an inventive method 301. Various aspects of the method 301 may be implemented by execution of computer executable instructions running on the output device 105 and/or the distributor 106 in conjunction with the actions of the output device 105. Specifically, an output device 105 may be configured, e.g., by suitable programming, to implement certain output device instructions 371'. In addition, a distributor 106 may be configured to implement certain distributor instructions 370'. In FIG. 3B the dashed arrows represent the flow of data between the distributor 106 and the output device 105 over a data connection 109.

Method 301 is similar to that of method 300, with the exception that the client device platform 104 of method 300 is replaced with a distributor 106. Utilization of a distributor 106 allows for an output device 105 to selectively receive content data 210 from multiple client device platforms 104. When the distributor 106 delivers content data 210 that is associated with a latency sensitive application, method 301 may be utilized.

Upon receiving content data 210 associated with a latency sensitive application the distributor 106 may deliver a latency reduction mode initiation signal 311 to the output device 105 at block 372'. The distributor 106 may insert the initiation signal 311 into the data stream containing the content data 210 being delivered to the output device 105. By way of example, and not by way of limitation, the initiation signal 311 may be inserted into a header for a packet containing content data 210, or the initiation signal 311 may be sent as individual data packet in addition to the content data 210.

Aspects of the present disclosure also describe an initiation signal 311 that may be a command signal delivered over the data connection 109. By way of example, and not by way of limitation, the initiation signal 311 may be a CEC command.

As such, the CEC command may be delivered over an HDMI data connection 109 in order to instruct the output device 105 to change the output mode to the latency reduction mode. Further by way of example, and not by way of limitation, the initiation signal 311 may be an IR command delivered to the output device 105 by an IR blaster 148".

Other additional aspects of the present disclosure also include having the distributor 106 deliver a latency reduction mode initiation signal 311 to the output device 105 when the content data 210 being delivered to the output device 105 originates from a client device platform 104 that is known to run applications that are latency sensitive. By way of example, and not by way of limitation, a client device platform 104 may be a gaming console that is used primarily for latency sensitive applications such as cloud based gaming. When this is the case, when the gaming console's content data 210 is being routed to the output device 105 the distributor 106 may always deliver the latency reduction initiation signal 311. The distributor 106 may predetermine which client device platforms 104 will be accompanied by an initiation signal 311 based factors such as, but not limited to, historical use, default settings, and/or user designation.

For example, historical use may be determined by calculating the total percentage of time a client device platform 104 utilizes a latency reduction mode. If the total percentage is over a threshold value, such as fifty percent or any other level, then the distributor will deliver the initiation signal 311. The total percentage may also be adjusted for factors such as time of the day, day of the week, or month. This may be beneficial if a user has a pattern of utilizing a certain client device platform 104 in the evenings for cloud based gaming sessions, and utilizing the same client device platform 104 in the morning for gaming sessions in which the game is stored in a memory or a disk within the client device platform 104.

Additionally, the distributor 106 may be programmed to recognize certain types of client device platforms 104 as ones that traditionally utilize applications that are latency sensitive. By way of example, a distributor 106 may recognize gaming consoles as being client device platforms that utilize latency sensitive applications, and therefore have predetermined defaults to add an initiation signal 311 upon the delivery of the content data 210 that originates from a gaming console. Alternatively, a client device platform 104 such as a cable box, may be traditionally seen as not miming latency sensitive applications, and as such the default may be to not add an initiation signal along with the content data 210 received from a cable box.

However, the predetermined defaults may not always be what a user desires. For instance, cable companies are beginning to deliver more cloud based content to users through cable boxes. Applications such as cloud based gaming and simultaneous group viewing experiences, such as those described in commonly owned patent application Ser. No. 13/631,622, to Joseph Dodson et al., entitled "PLAYBACK SYNCHRONIZATION IN A GROUP VIEWING A MEDIA TITLE", and filed date, month, year, and incorporated herein in its entirety, are becoming more common Therefore, a user may often use a cable box for these types of latency sensitive applications, and it may be desirable to allow the user to change the default settings of the distributor 106 to best suit their personal preferences.

At 373' the output device 105 may receive the latency reduction mode initiation signal 311. The output device 105 may respond to reception of the initiation signal 311 by automatically changing the output mode from a first output mode to a latency reduction mode. By way of example, and not by way of limitation, the first output mode may be the default output mode of the output device 105 or it may be an alternative display mode optimized for observing specific types of media, such as a movie display mode or a sports channel display mode. When the initiation signal 311 is not a command signal, the initiation signal 311 may indicate that the output device 105 needs to execute an output mode switching program in order to change the output mode to the latency reduction mode. By way of example, the output mode switching program may be a program 133' stored on the CPU 131' or in a memory 132' of the output device 105 that when executed causes the output device 105 to change the output mode to the latency reduction mode. If the initiation signal 311 is a CEC command or an IR command, then initiation signal 311 may be configured to control the output device 105 and will automatically cause the output device 105 to change the output mode to the latency reduction mode without having to run an additional operation.

When the distributor 106 is no longer delivering content data 210 that corresponds to a latency sensitive application to the output device 105, the distributor 106 may automatically deliver an end latency reduction mode signal 312 to the output device as shown at block 375'. The end latency reduction mode signal 312 may be similar to that of latency reduction mode initiation signal 311 in that it may be a signal sent along with the content data 210, or it may be a CEC command signal or an IR command signal. At 376' the output device 105 may receive the end latency reduction mode signal 312. Upon receiving the end latency reduction mode signal 312, the output device 105 may change the output mode back to the first output mode. Similar to block 374', if the end latency reduction mode signal 312 is not a command signal, the end latency reduction mode signal 312 may indicate that the output device 105 needs to execute an output mode switching program in order to change the output mode back to the first output mode. Alternatively, if the end latency reduction mode signal 312 is a CEC command or an IR command, then end latency reduction mode signal 312 may be configured to control the output device 105 and will automatically cause the output device 105 to change the output mode back to the first output mode without having to run an additional operation.

Figure 4:
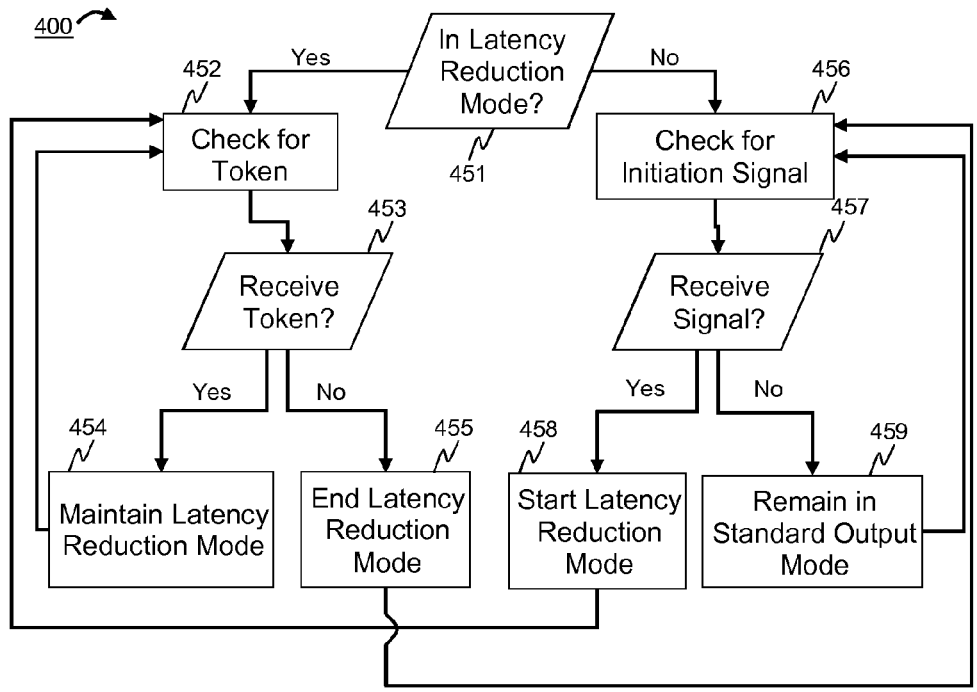
FIG. 4 is a flow diagram of a method for detecting when a latency reduction mode initiation signal is received and when an end latency reduction mode signal is received according to an aspect of the present disclosure.

According to additional aspects of the present disclosure, the latency reduction mode initiation signal 311 and end latency reduction mode 312 may be implemented through a token system described in FIG. 4. The use of a token system may be implemented when the initiation signal 311 is a non-command signal delivered by either a client device platform 104 or a distributor 106. The client device platform 104 or the distributor 106 may insert the initiation signal 311 into the data stream containing the content data 210 being delivered to the output device 105. By way of example, and not by way of limitation, the initiation signal 311 may be inserted into a header for a packet containing content data 210, or the initiation signal 311 may be sent as individual data packet in addition to the content data 210. Once the initiation signal 311 has been delivered, the sending device 104 or 106 will continue to supply tokens along with the content data 210 as long as the latency reduction mode is desired. By way of example, and not by way of limitation, the tokens may be delivered in a header of subsequent content data 210, or it may be delivered as individual data packets in addition to the content data 210. The tokens may be delivered with each packet of the content data 210, or they may be delivered along with the content data at regular intervals, such as every, 1, 5, or 10 seconds or any other desired interval length. When the latency reduction mode is no longer desired, the sending device 104 or 106 may cease the delivery of the tokens. The non-receipt of a token is considered the end latency reduction mode signal, and as such the output device 105 will be instructed to change the output mode back to the first state.

The token system may be implemented in accordance with method 400. In method 400 an output device 105 must first determine if it is presently in a latency reduction mode at decision block 451. If it is not in a latency reduction mode, then method 400 proceeds to block 456 where the output device 105 must check for receipt of a latency reduction initiation signal 311. If the output device 105 determines that an initiation signal 311 has been received at decision block 457, then output device 105 progresses to block 458 and initiates the latency reduction mode. Once the latency reduction mode is initiated, method 400 progresses to block 452. If however an initiation signal 311 was not received at block 457, then method 400 progresses to block 459 and remains in the first output mode. Thereafter, the method continues back to block 456 to continue checking for a latency reduction initiation signal 311.

If the answer to block 451 is yes, then method 400 proceeds to block 452. At block 452, the output device 105 is instructed to check for a token and proceeds to decision block 453. If the output device 105 has received a token at block 453, then the method continues to block 454 and the output device 105 will remain in the latency reduction mode. After block 454, the method begins the loop again by advancing back to block 452 where the method will check again for a token. However, if a token was not received at block 453, then method 400 continues to block 455. At block 455 the output device 105 ends the latency reduction mode and reverts back to the first output mode. Thereafter, the method continues on to block 456, where the output device will begin checking for an initiation signal 311. It is noted that in some implementations, the initiation signal 311 may be in the form of a token.

According to additional aspects of the present disclosure, the output device may provide information to the client device platform 104, the distributor 106, or the content provider 107 informing them what the first output mode was. The information may be provided as a result of a query from either of the devices 104, 106 or from the content provider 107. Alternatively, the output device may automatically deliver the information back to the devices 104, 106 or the content provider 107 upon receiving a latency reduction mode initiation signal 311. This is useful when the end latency reduction mode signal 312 is a command signal such as a CEC command, or an IR command, because the signal may include a command to revert the output mode back to the first output mode without further processing by the output device 105.

According to other additional aspects of the present disclosure the client device platform 104 may be configured, e.g., by suitable programming or dedicated hardware to be able to query the result of the latency reduction. Assuming there was a failure of the output device 105 to move to a low latency mode, the 'query result capability' allows the client device 104 to present a notification to that effect to the user. For instance the client device 104 may show a message stating that cloud gaming is not possible because the latency is too high.

Figure 5:
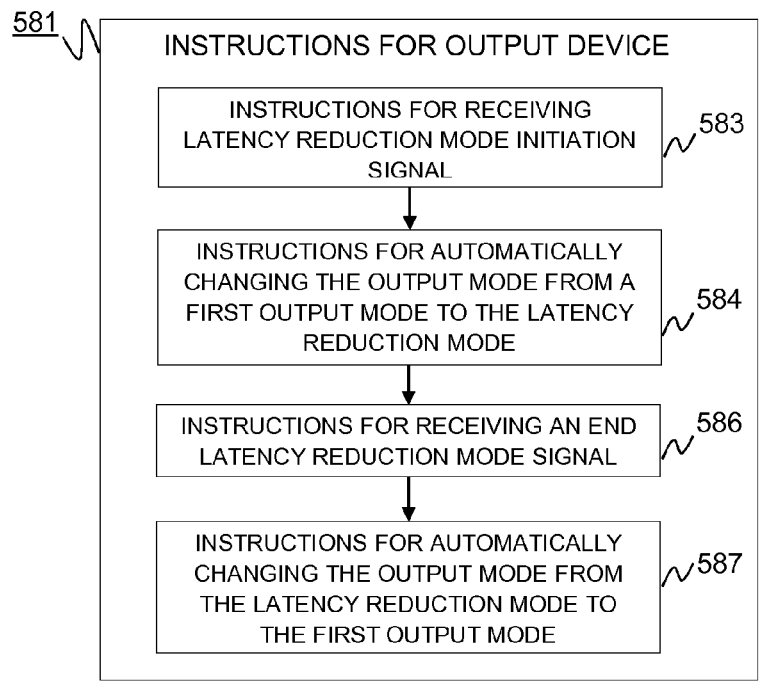
FIG. 5 is a block diagram describing the instructions for how an output device automatically changes the output mode from a first output mode to a latency reduction output mode according to an additional aspect of the present disclosure.

As shown in FIG. 5, a set of output device instructions 581 may be implemented, e.g., by the output device 105. The output device instructions 581 may be formed on a nontransitory computer readable medium such as the memory 132' or the mass storage device 134'. The output device instructions 581 may also be part of the process control program 133'. At 583, the instructions may include instructions for receiving a latency reduction mode initiation signal. Thereafter, the output device instructions 581 may include instructions for the output device 105 to automatically change the output mode from a first output mode to the latency reduction mode at 584. At 586, the output device 104 may be instructed to receive an end latency reduction mode signal. Thereafter the instruction 581 may include instructions for automatically changing the output mode from the latency reduction mode back to the first output mode at 587 in response to receipt of the end latency reduction mode signal.

Figure 6A:
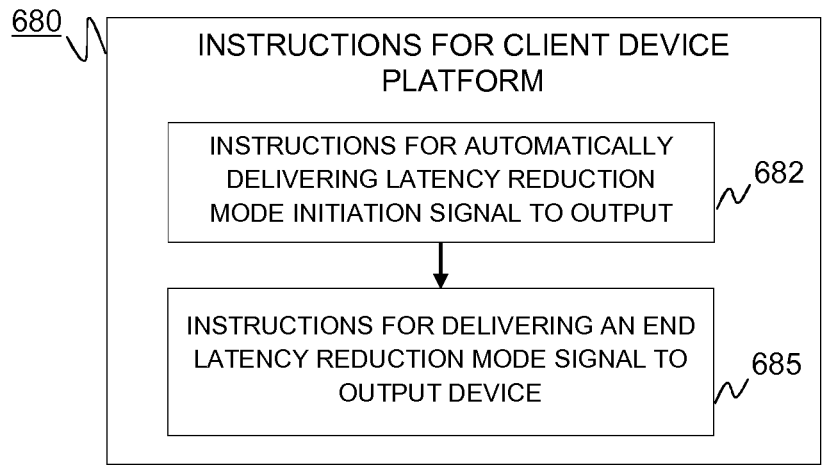
FIG. 6A is a block diagram describing the instructions for how a client device platform automatically changes the output mode of an output device from a first output mode to a latency reduction output mode according to an additional aspect of the present disclosure.

As shown in FIG. 6A, a set of client device platform instructions 680 may be implemented, e.g., by the client device platform 104. The client device platform instructions 680 may be formed on a nontransitory computer readable medium such as the memory 132 or the mass storage device 134. The client device platform instructions 680 may also be part of the process control program 133. At 682, the instructions may include instructions for automatically delivering a latency reduction mode initiation signal to the output device 105 upon entering or resuming a latency-sensitive application. Thereafter, at 685 the instructions may include instructing the client device platform 104 to automatically deliver the end latency mode signal to the output device 105, e.g., upon ending, exiting or suspending the latency-sensitive application.

Figure 6B:
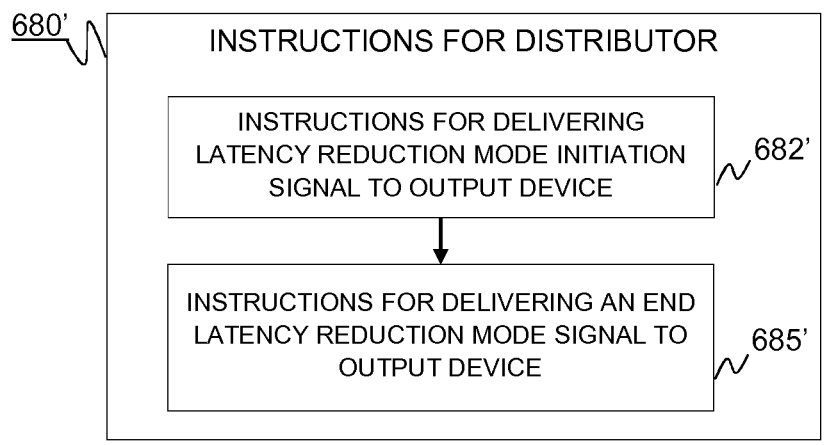
FIG. 6B is a block diagram describing the instructions for how a distributor automatically changes the output mode of an output device from a first output mode to a latency reduction output mode according to an additional aspect of the present disclosure.

As shown in FIG. 6B, a set of distributor instructions 680' may be implemented, e.g., by the distributor 106. The distributor instructions 680' may be formed on a nontransitory computer readable medium such as the memory 132" or the mass storage device 134". The distributor instructions 680' may also be part of the process control program 133". At 682', the instructions may include instructions for automatically delivering a latency reduction mode initiation signal to the output device 105. Thereafter, at 685' the instructions may include instructing the distributor 106 to automatically deliver the end latency mode signal to the output device 105.

Aspects of the present disclosure also encompass situations where a latency reduction mode is not available at the output device 105. For example, in some cases the client device 104 may query the output device and determine that a reduced latency mode is not available. In such a case, the client device 104 may be configured to respond to a determination that the output device is not able to go into a reduced latency mode by presenting a warning to the user and/or by disabling access to certain content that is latency sensitive.

According to some aspects of the present disclosure the client device 104 may be configured to query the output device 105 to determine whether the output device is operating in a low latency mode or whether the output device is even capable of operating in such a mode. The client device may implement such a query, e.g., though suitable instructions in the program, 133.

There are a number of different ways in which one could implement the latency mode query on the part of the client device. For example, a 'latency status query' could be sent by the client device 104 through the same channel used to initiate the reduced latency mode switch. Depending on how reduced latency mode switching' is implemented there may or may not be a way to query the result. In case of HDMI-CEC a status query could be implemented, but using an IR-blaster this could be impractical since the communication is one-way.

One possible way to implement a latency mode query with the client device would be to send the latency mode switch signal to the output device and then check to see if the latency of the output device subsequently changes. In some implementations, a basic latency test of this type could be conducted through use of a camera coupled to or part of the client device 104 and a test pattern displayed by the output device and viewed by the camera. A webcam or mobile phone may be sufficiently latency-sensitive to notice a difference in latency between before and after switching to or from the latency reduction mode. Alternatively, server-client latency may be tested, e.g., by timing button presses on a gamepad to a camera.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A nontransitory computer readable medium containing instructions for changing an output mode on an output device from a first output mode to a latency reduction mode, and wherein execution of the program instructions by one or more processors of a computer system causes the one or more processors to carry out a method, the method comprising:
   a) receiving a latency reduction mode initiation signal;
   b) automatically changing the output mode from the first output mode to the latency reduction mode in response to receipt of the latency reduction mode signal, wherein the latency reduction mode causes the output device to cease one or more processing operations on a set of content data displayed by the output device;
   c) receiving an end latency reduction mode signal; and
   d) automatically changing the output mode from the latency reduction mode to the first output mode in response to receipt of the end latency reduction mode signal, wherein the latency reduction mode initiation signal is a token that is received along with the content data that will be displayed by the output device, wherein the token is continuously received at regular intervals with subsequent content data received by the output device, and wherein the end latency reduction mode signal is the absence of a token in the content data received by the output device.

2. The nontransitory computer readable medium of claim 1, wherein the latency reduction mode initiation signal and the end latency reduction mode signal are received over a high-definition multimedia interface (HDMI) connection.

3. The nontransitory computer readable medium of claim 2, wherein the latency reduction mode initiation signal and the end latency reduction mode signal are consumer electronics control (CEC) commands.

4. The nontransitory computer readable medium of claim 2, wherein the HDMI connection is a wireless HDMI connection.

5. The nontransitory computer readable medium of claim 1, wherein the latency reduction mode initiation signal and the end latency reduction mode signal are received from an infrared (IR) blaster.

6. The nontransitory computer readable medium of claim 1, wherein the latency reduction mode initiation signal and the end latency reduction mode signal are received from a client device platform.

7. The nontransitory computer readable medium of claim 6, wherein the client device platform is a gaming console.

8. The nontransitory computer readable medium of claim 6, wherein the client device platform is a set top box.

9. The nontransitory computer readable medium of claim 6, wherein the client device platform is a computer.

10. The nontransitory computer readable medium of claim 6, wherein the client device platform is a telephonic system.

11. The nontransitory computer readable medium of claim 1, wherein the content data is a video game.

12. The nontransitory computer readable medium of claim 1, wherein the content data is a video stream.

13. The nontransitory computer readable medium of claim 1, wherein the content data is an audio stream.

14. The nontransitory computer readable medium of claim 1, wherein the content data is data stream of a computer program session running on a remote machine.

15. The nontransitory computer readable medium of claim 1, wherein the output device is a television.

16. The nontransitory computer readable medium of claim 1, wherein the output device is a projector.

17. The nontransitory computer readable medium of claim 1, wherein the output device is one or more speakers.

18. A nontransitory computer readable medium containing instructions for changing an output mode on an output device from a first output mode to a latency reduction mode, and wherein execution of the program instructions by one or more processors of a computer system causes the one or more processors to carry out a method, the method comprising:
   a) receiving a latency reduction mode initiation signal;
   b) automatically changing the output mode from the first output mode to the latency reduction mode in response to receipt of the latency reduction mode signal, wherein the latency reduction mode causes the output device to cease one or more processing operations on a set of content data displayed by the output device;
   c) receiving an end latency reduction mode signal; and
   d) automatically changing the output mode from the latency reduction mode to the first output mode in response to receipt of the end latency reduction mode signal wherein the latency reduction mode initiation signal and the end latency reduction mode signal are received from a distributor, and wherein the distributor is configured to selectively route content data from one of a plurality of client device platforms to the output device.

19. The nontransitory computer readable medium of claim 18, wherein the distributor delivers the latency reduction mode initiation signal and the end latency reduction mode signal when the content data received by the output device originated from a client device platform that received the content data from a cloud based content provider.

20. The nontransitory computer readable medium of claim 18, wherein the distributor predetermines which of the plurality of client device platforms should include a latency reduction mode initiation signal when their content data is selectively routed to the output device.

21. The nontransitory computer readable medium of claim 20, wherein the distributor predetermines which of the plurality of client device platforms should include a latency reduction mode initiation signal when their content data is selectively routed to the output device when a client device platform by utilizing historical use data.

22. The nontransitory computer readable medium of claim 20, wherein the distributor predetermines which of the plurality of client device platforms should include a latency reduction mode initiation signal when their content data is selectively routed to the output device when a client device platform by utilizing default settings and/or user designations.

23. The nontransitory computer readable medium of claim 21, wherein the audio stream is telephonic conversation.

24. The nontransitory computer readable medium of claim 18, wherein the latency reduction mode initiation signal and the end latency reduction mode signal are received over a high-definition multimedia interface (HDMI) connection.

25. The nontransitory computer readable medium of claim 24, wherein the latency reduction mode initiation signal and the end latency reduction mode signal are consumer electronics control (CEC) commands.

26. The nontransitory computer readable medium of claim 24, wherein the HDMI connection is a wireless HDMI connection.

27. The nontransitory computer readable medium of claim 18, wherein the latency reduction mode initiation signal and the end latency reduction mode signal are received from an infrared (IR) blaster.

28. An output device, comprising:
a processor;
a memory coupled to the processor;
one or more instructions embodied in memory for execution by the processor, the instructions being configured to implement a method for changing an output mode on an output device from a first output mode to a latency reduction mode, the method comprising:
a) receiving a latency reduction mode initiation signal from a distributor, wherein the distributor is configured to selectively route content data from one of a plurality of client device platforms to the output device;
b) automatically changing the output mode from the first output mode to the latency reduction mode in response to receipt of the latency reduction mode signal, wherein the latency reduction mode causes the output device to cease one or more processing operations on a set of content data displayed by the output device;
c) receiving an end latency reduction mode signal from the distributor; and
d) automatically changing the output mode from the latency reduction mode to the first output mode in response to receipt of the end latency reduction mode signal.

29. A method, comprising:
a) receiving a latency reduction mode initiation signal from a distributor, wherein the distributor is configured to selectively route content data from one of a plurality of client device platforms to the output device;
b) automatically changing the output mode from the first output mode to the latency reduction mode in response to receipt of the latency reduction mode signal, wherein the latency reduction mode causes the output device to cease one or more processing operations on a set of content data displayed by the output device;
c) receiving an end latency reduction mode signal from the distributor; and
d) automatically changing the output mode from the latency reduction mode to the first output mode in response to receipt of the end latency reduction mode signal.

30. A nontransitory computer readable medium containing instructions for changing an output mode on an output device from a first output mode to a latency reduction mode, and wherein execution of the program instructions by one or more processors of a computer system causes the one or more processors to carry out a method, the method comprising:
a) receiving a latency reduction mode initiation signal, wherein the latency reduction mode initiation signal and an end latency reduction mode signal are received over a high-definition multimedia interface (HDMI) connection;
b) automatically changing the output mode from the first output mode to the latency reduction mode in response to receipt of the latency reduction mode initiation signal, wherein the latency reduction mode causes the output device to cease one or more processing operations on a set of content data displayed by the output device;
c) receiving an end latency reduction mode signal, wherein the latency reduction mode initiation signal and the end latency reduction mode signal are consumer electronics control (CEC) commands; and
d) automatically changing the output mode from the latency reduction mode to the first output mode in response to receipt of the end latency reduction mode signal, wherein the latency reduction mode initiation signal is a token that is received along with the content data that will be displayed by the output device, wherein the token is continuously received at regular intervals with subsequent content data received by the output device, and wherein the end latency reduction mode signal is the absence of a token in the content data received by the output device.

* * * * *